United States Patent
Chen

(10) Patent No.: US 10,041,615 B2
(45) Date of Patent: *Aug. 7, 2018

(54) MULTIFUNCTION INTEGRATED CONNECTION HEAD ASSEMBLY STRUCTURE

(71) Applicant: COOLER MASTER CO., LTD., New Taipei (TW)

(72) Inventor: Hsin-Hung Chen, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/786,123

(22) Filed: Oct. 17, 2017

(65) Prior Publication Data

US 2018/0038528 A1 Feb. 8, 2018

Related U.S. Application Data

(62) Division of application No. 14/720,942, filed on May 25, 2015, now Pat. No. 9,829,132.

(51) Int. Cl.
| | |
|---|---|
| *F16L 25/01* | (2006.01) |
| *G06F 1/20* | (2006.01) |
| *F16L 37/56* | (2006.01) |

(52) U.S. Cl.
CPC .............. *F16L 25/01* (2013.01); *F16L 37/56* (2013.01); *G06F 1/20* (2013.01)

(58) Field of Classification Search
CPC . F16L 39/06; F16L 21/08; F16L 25/01; F16L 37/56; Y10T 137/87885; Y10T 137/5109; Y10T 137/5283; Y10T 137/87925; Y10T 137/87949; Y10T 137/87957; F16K 27/003; G06F 1/20
USPC ..... 137/884, 269, 271, 614, 614.02, 614.03, 137/614.04; 439/191, 210
See application file for complete search history.

(56) References Cited

U.S. PATENT DOCUMENTS

| | | | | |
|---|---|---|---|---|
| 3,673,541 A | * | 6/1972 | Volinskie | F16L 25/01 285/119 |
| 3,777,298 A | * | 12/1973 | Newman | B23K 9/323 439/191 |
| 5,074,802 A | * | 12/1991 | Gratziani | B23K 9/291 219/75 |
| 5,637,006 A | * | 6/1997 | Almeras | H01R 13/005 439/191 |

(Continued)

*Primary Examiner* — Michael R Reid
(74) *Attorney, Agent, or Firm* — Maschoff Brennan

(57) ABSTRACT

A multifunction integrated connection head assembly structure includes a first connection head module and a second connection head module. The first connection head module includes a first carrier body, at least two first fluid connectors, a first power connector, and a first retaining body. The second connection head module includes a second carrier body detachably connected with the first carrier body, at least two second fluid connectors respectively detachably connected with the at least two first fluid connectors, a second power connector detachably electrically connected with the first power connector, and a second retaining body detachably mated with the first retaining body. An electrical device using a multifunction integrated connection head assembly structure is further disclosed.

5 Claims, 15 Drawing Sheets

(56) References Cited

U.S. PATENT DOCUMENTS

| | | | | |
|---|---|---|---|---|
| 6,598,279 B1 * | 7/2003 | Morgan | ............... | H01R 13/005 285/26 |
| 6,799,605 B1 * | 10/2004 | Van Scyoc | .............. | F16L 37/56 137/594 |
| 7,465,177 B2 * | 12/2008 | Wood | ................... | H01R 13/005 439/191 |
| 9,829,132 B2 * | 11/2017 | Chen | ....................... | F16L 37/56 |

\* cited by examiner

MULTIFUNCTION INTEGRATED CONNECTION HEAD ASSEMBLY STRUCTURE This application is a divisional application of Ser. No. 14/720,942 filed on May 25, 2015, and entitled "ELECTRONIC DEVICE AND MULTIFUNCTION INTEGRATED CONNECTION HEAD ASSEMBLY STRUCTURE THEREOF," now pending, the entire disclosures of which are incorporated herein by reference.

BACKGROUND OF THE INVENTION

1. Field of the Invention

The instant disclosure relates to a connection head assembly structure, and more particularly to a multifunction integrated connection head assembly structure thereof.

2. Description of Related Art

A water block heat-dissipating structure includes a seat body and a seal cover body. The seat body has a plurality of heat-dissipating fins formed thereon, and a bottom portion of the seat body contacting a heat-generating source. In addition, the seal cover body is used to seal and cover the seat body. The seal cover body further has a water inlet and a water outlet. When the bottom portion of the seat body contacts a heat-generating source, heat is transmitted from the heat-generating source to the heat-dissipating fins. In addition, the heat of the first heat-dissipating fins can be guided away quickly by cooling liquids that circulate between the water inlet and the water outlet.

SUMMARY OF THE INVENTION

One aspect of the instant disclosure relates to an electronic device and a multifunction integrated connection head assembly structure thereof.

One of the embodiments of the instant disclosure provides a multifunction integrated connection head assembly structure, comprising: a first connection head module and a second connection head module. The first connection head module includes a first carrier body, at least two first fluid connectors passing through the first carrier body, a first power connector passing through the first carrier body, and a first retaining body disposed on the first carrier body. The second connection head module is detachably connected with the first connection head module, wherein the second connection head module includes a second carrier body detachably connected with the first carrier body, at least two second fluid connectors passing through the second carrier body and respectively detachably connected with the at least two first fluid connectors, a second power connector passing through the second carrier body and detachably electrically connected with the first power connector, and a second retaining body disposed on the second carrier body and detachably mated with the first retaining body. More particularly, each first fluid connector has a first inside connection portion and a first outside connection portion opposite to the first inside connection portion and connected to a first external joint pipe, and each second fluid connector has a second inside connection portion connected with the corresponding the first inside connection portion and a second outside connection portion opposite to the second inside connection portion and connected to a second external joint pipe. The first power connector includes a first inside conductive connection portion and a first outside conductive connection portion opposite to the first inside conductive connection portion and electrically connected to a first external conductive wire, and the second power connector includes a second inside conductive connection portion and electrically connected with the first inside conductive connection portion and a second outside conductive connection portion opposite to the second inside conductive connection portion and electrically connected to a second external conductive wire.

Another one of the embodiments of the instant disclosure provides an electronic device using a multifunction integrated connection head assembly structure. The multifunction integrated connection head assembly structure comprises: a first connection head module and a second connection head module. The first connection head module includes a first carrier body, at least two first fluid connectors passing through the first carrier body, a first power connector passing through the first carrier body, and a first retaining body disposed on the first carrier body. The second connection head module is detachably connected with the first connection head module, wherein the second connection head module includes a second carrier body detachably connected with the first carrier body, at least two second fluid connectors passing through the second carrier body and respectively detachably connected with the at least two first fluid connectors, a second power connector passing through the second carrier body and detachably electrically connected with the first power connector, and a second retaining body disposed on the second carrier body and detachably mated with the first retaining body. More particularly, each first fluid connector has a first inside connection portion and a first outside connection portion opposite to the first inside connection portion and connected to a first external joint pipe, and each second fluid connector has a second inside connection portion connected with the corresponding the first inside connection portion and a second outside connection portion opposite to the second inside connection portion and connected to a second external joint pipe. The first power connector includes a first inside conductive connection portion and a first outside conductive connection portion opposite to the first inside conductive connection portion and electrically connected to a first external conductive wire, and the second power connector includes a second inside conductive connection portion and electrically connected with the first inside conductive connection portion and a second outside conductive connection portion opposite to the second inside conductive connection portion and electrically connected to a second external conductive wire.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
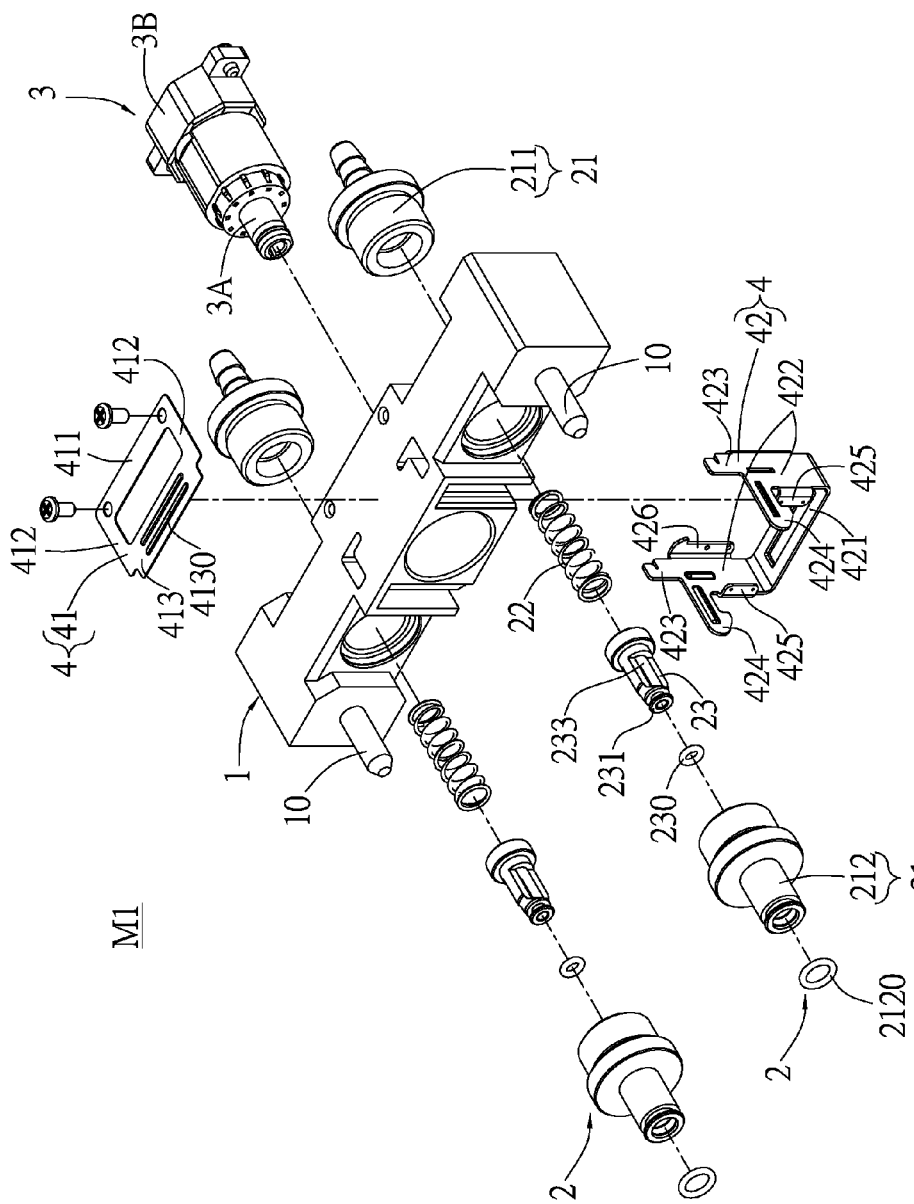
FIG. 1 shows a perspective, exploded, schematic view of the first connection head module of the multifunction integrated connection head assembly structure according to the instant disclosure.
Figure 2:
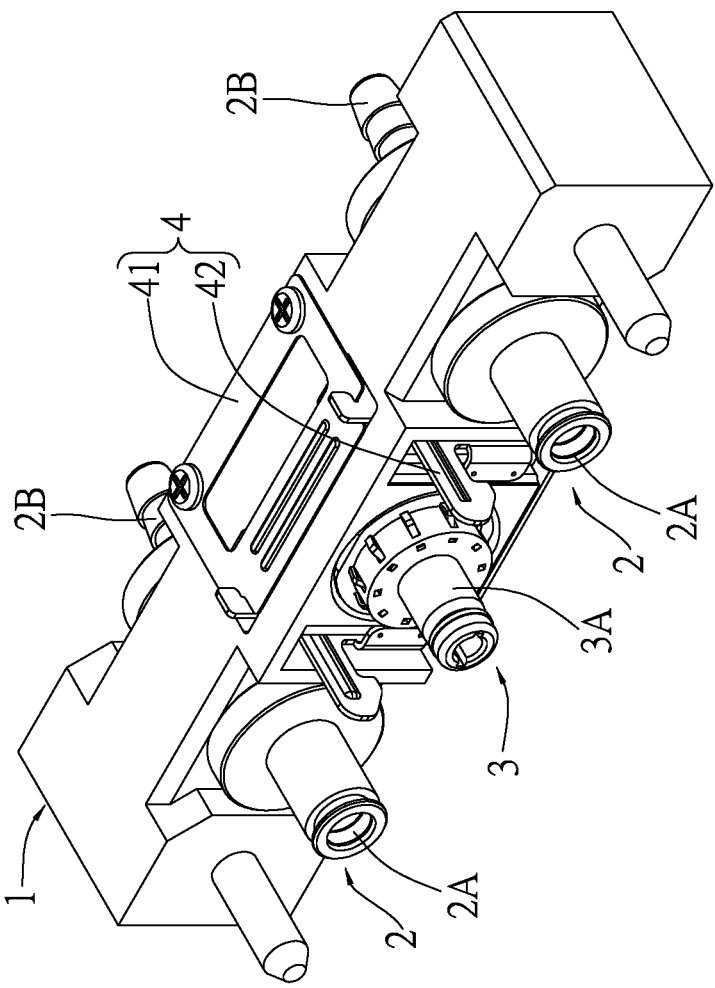
FIG. 2 shows a perspective, assembled, schematic view of the first connection head module of the multifunction integrated connection head assembly structure according to the instant disclosure.
Figure 3:
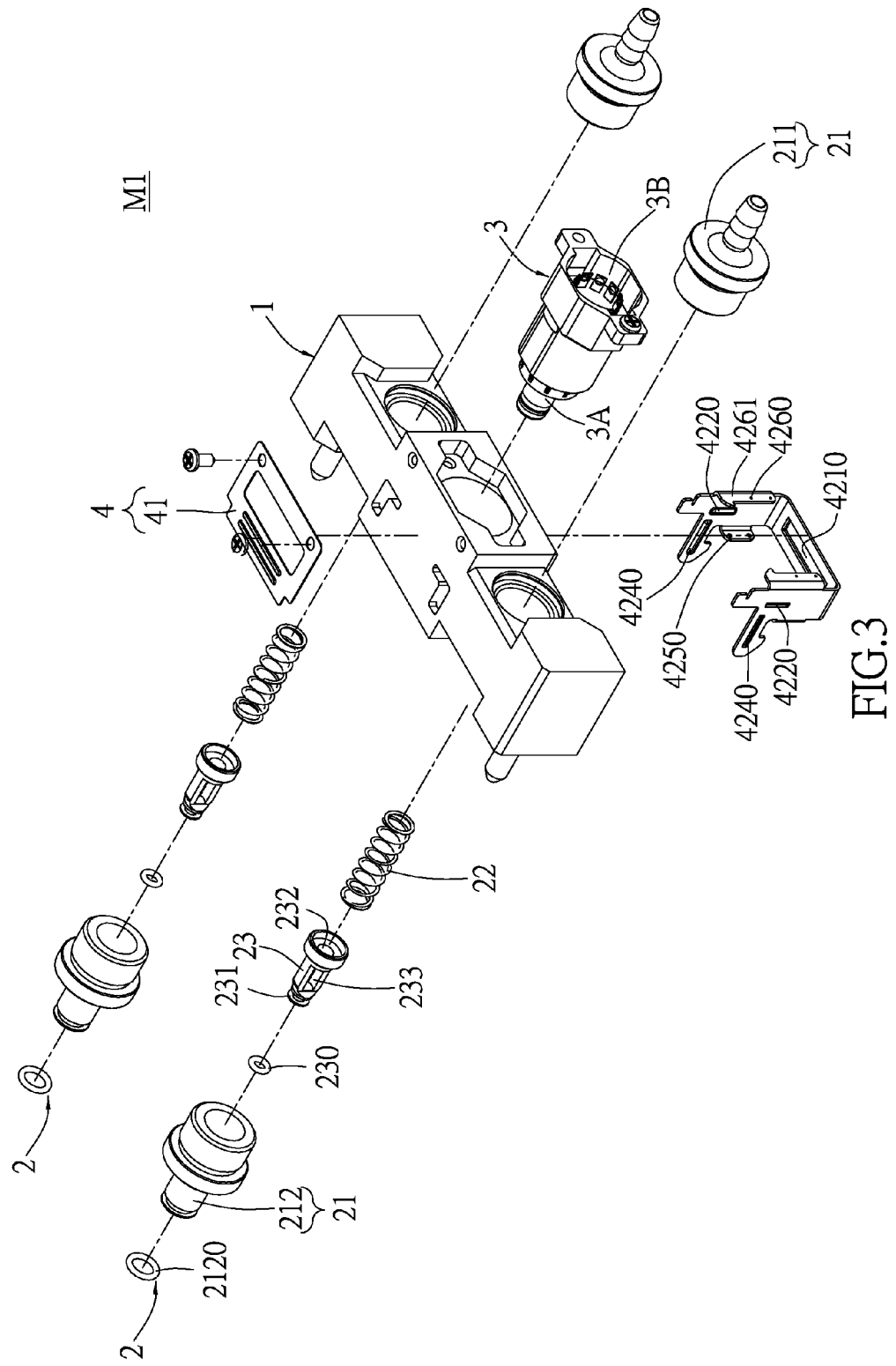
FIG. 3 shows another perspective, exploded, schematic view of the first connection head module of the multifunction integrated connection head assembly structure according to the instant disclosure.
Figure 4:
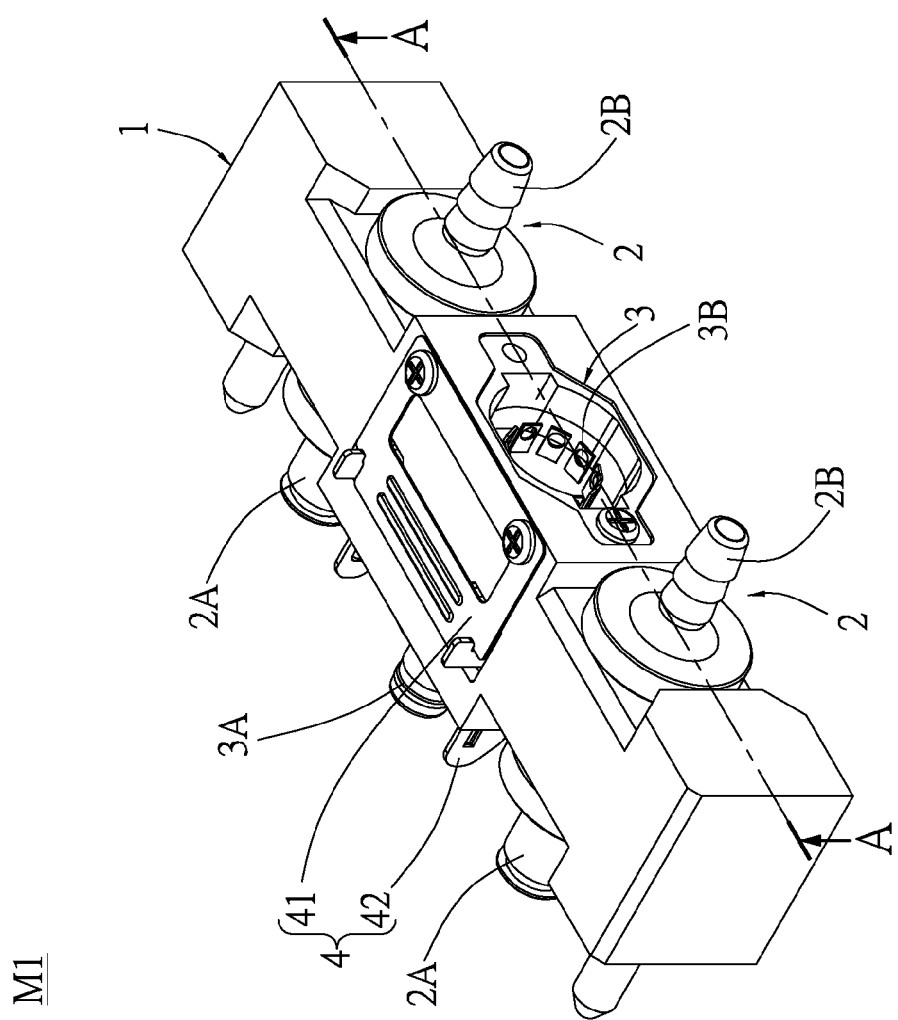
FIG. 4 shows another perspective, assembled, schematic view of the first connection head module of the multifunction integrated connection head assembly structure according to the instant disclosure.
Figure 5:
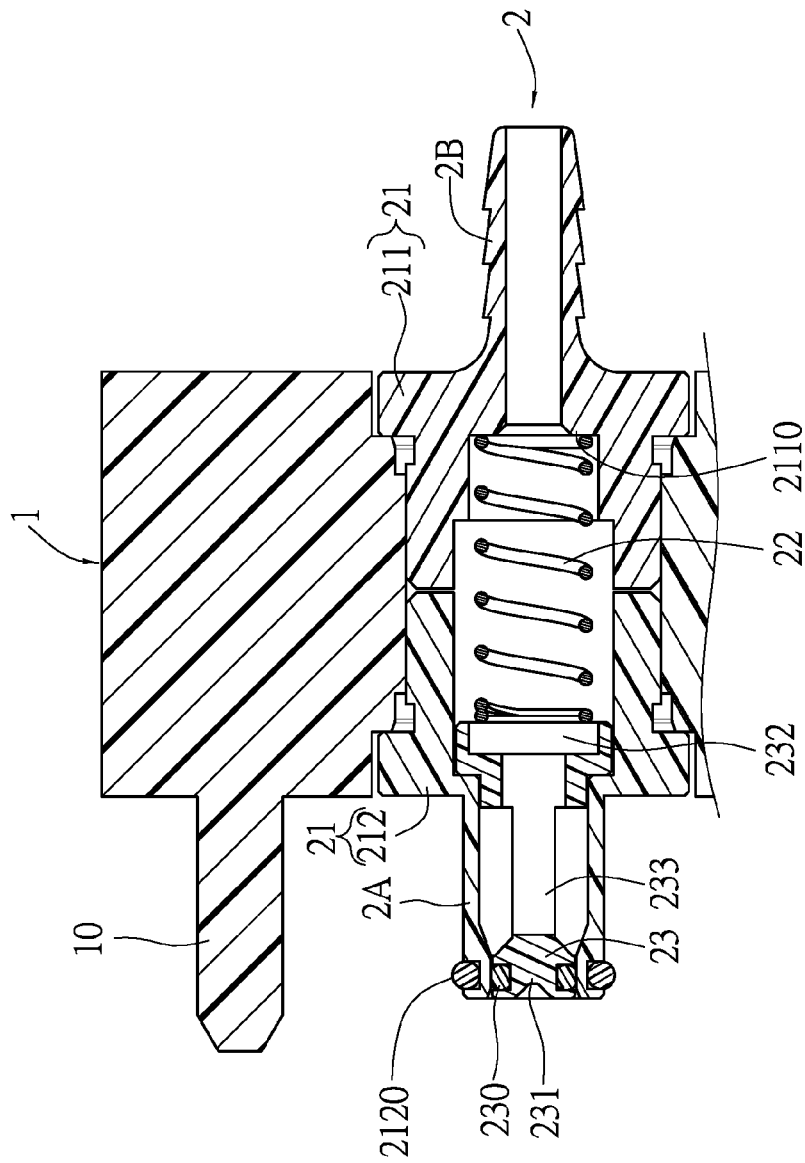
FIG. 5 shows a cross-sectional view taken along the section line A-A of FIG. 4.
Figure 6:
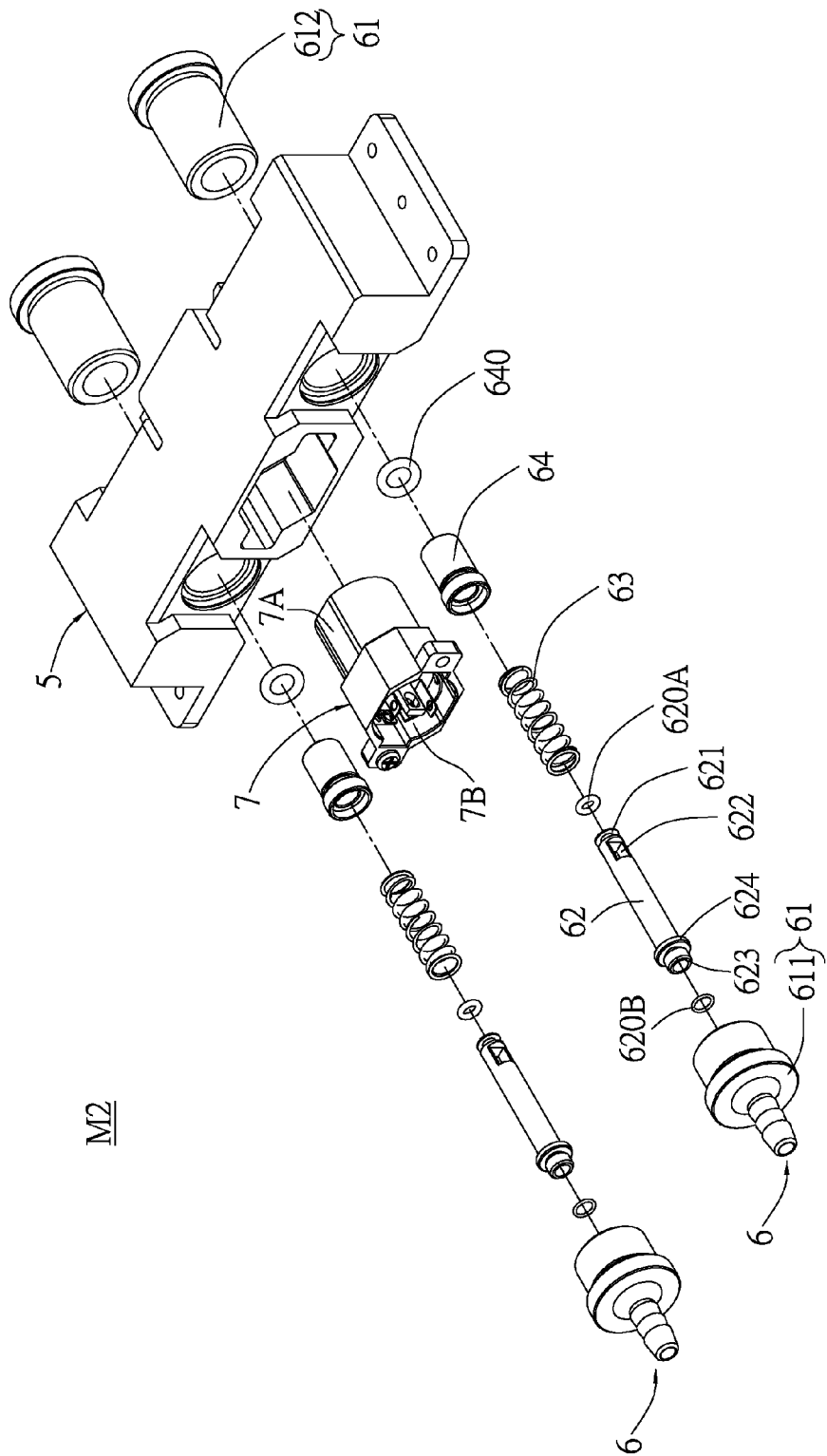
FIG. 6 shows a perspective, exploded, schematic view of the second connection head module of the multifunction integrated connection head assembly structure according to the instant disclosure.
Figure 7:
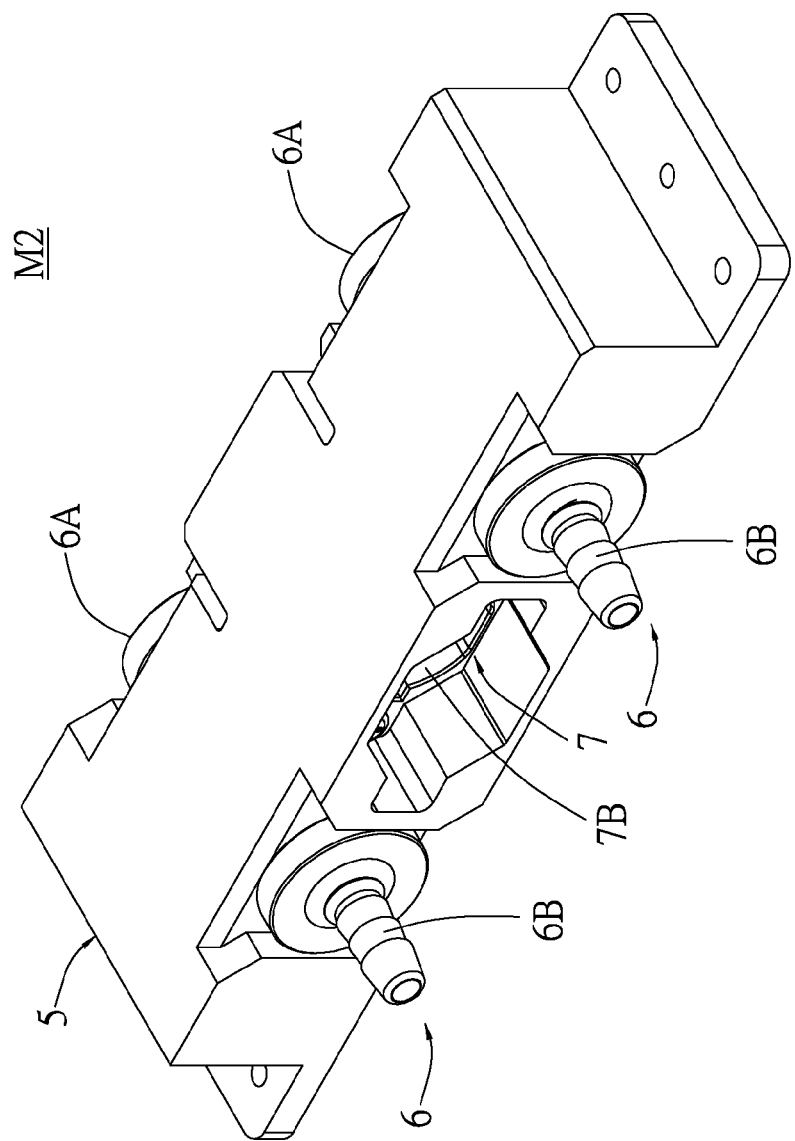
FIG. 7 shows a perspective, assembled, schematic view of the second connection head module of the multifunction integrated connection head assembly structure according to the instant disclosure.
Figure 8:
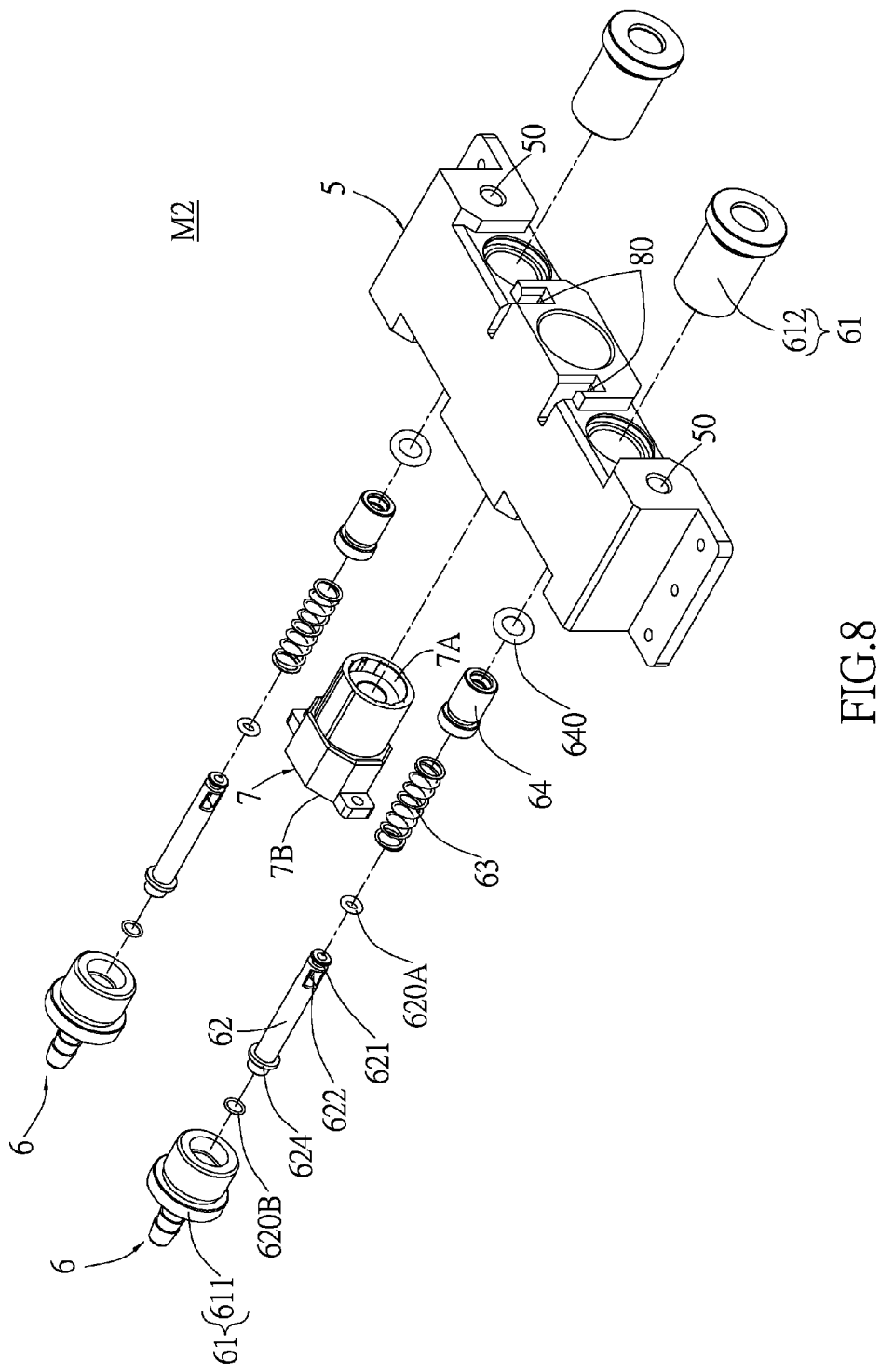
FIG. 8 shows another perspective, exploded, schematic view of the second connection head module of the multifunction integrated connection head assembly structure according to the instant disclosure.
Figure 9:
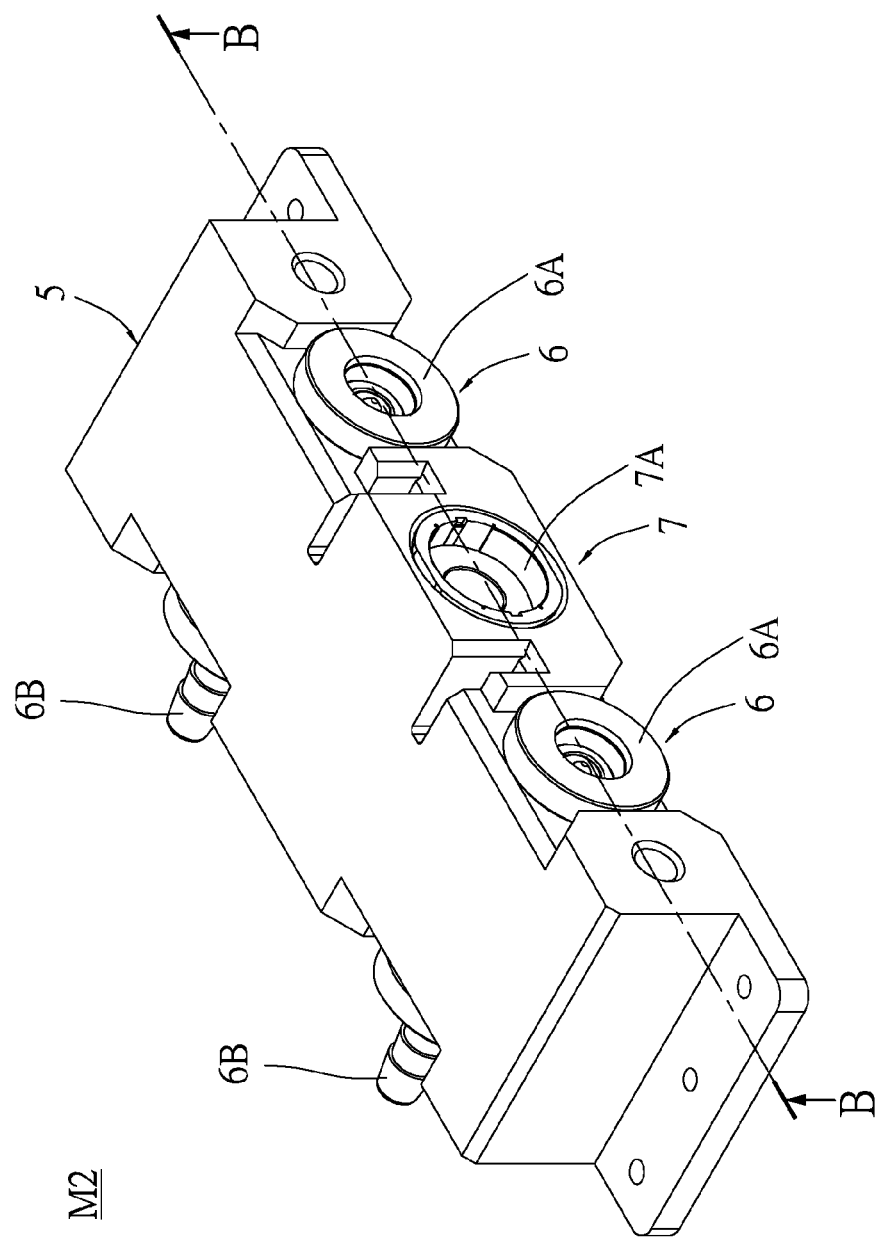
FIG. 9 shows another perspective, assembled, schematic view of the second connection head module of the multifunction integrated connection head assembly structure according to the instant disclosure.
Figure 10:
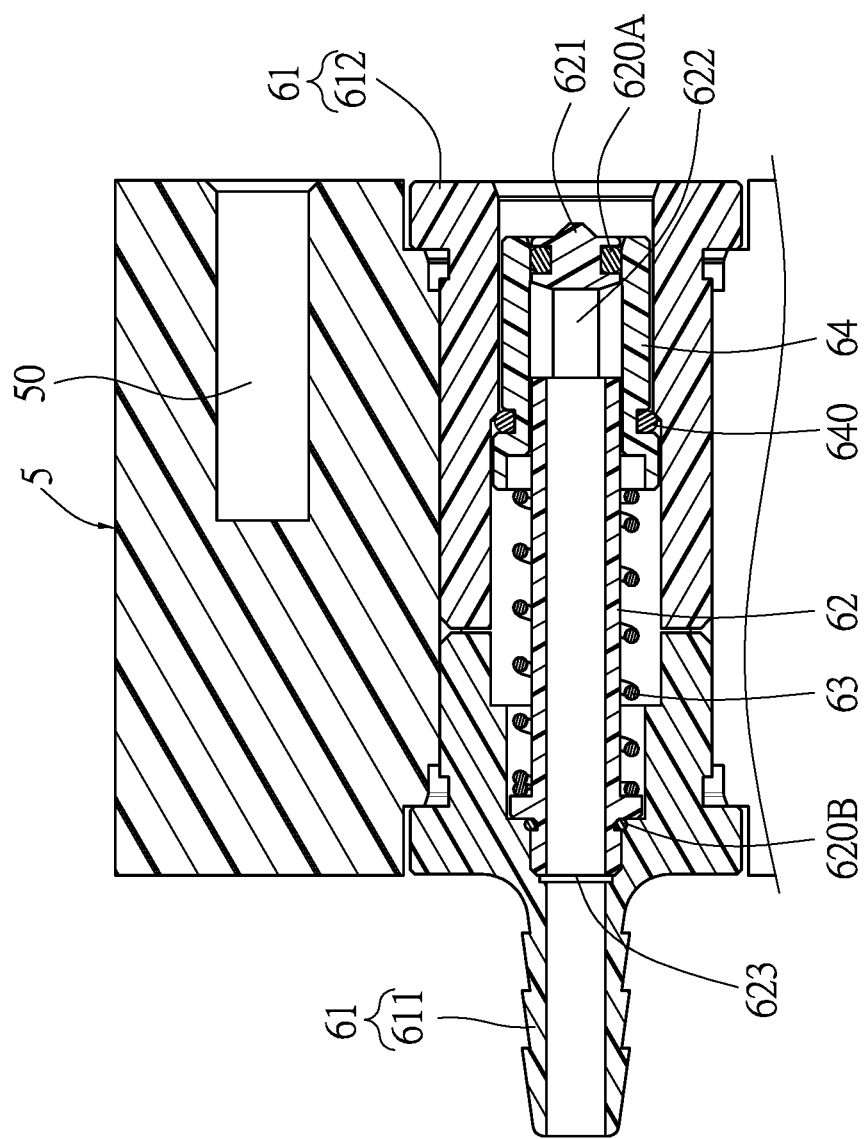
FIG. 10 shows a cross-sectional view taken along the section line B-B of FIG. 9.

The embodiments of "an electronic device and a multifunction integrated connection head assembly structure thereof" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 15, the instant disclosure provides a multifunction integrated connection head assembly structure M, comprising: a first connection head module M1 and a second connection head module M2, and the multifunction integrated connection head assembly structure M may be used as a quick-release connector assembly for integrating fluid channels with conductive channels.

First, referring to FIG. 1 to FIG. 5, and FIG. 11 to FIG. 13, the first connection head module M1 includes a first carrier body 1, at least two first fluid connectors 2 passing through the first carrier body 1, a first power connector 3 passing through the first carrier body 1, and a first retaining body 4 disposed on the first carrier body 1. More particularly, each first fluid connector 2 has a first inside connection portion 2A and a first outside connection portion 2B opposite to the first inside connection portion 2A and connected to a first external joint pipe P1 (such as a flexible hose), and the first power connector 3 includes a first inside conductive connection portion 3A and a first outside conductive connection portion 3B opposite to the first inside conductive connection portion 3A and electrically connected to a first external conductive wire C1.

For example, the first carrier body 1 has at least two first positioning portions 10. Each first fluid connector 2 includes a first assembling pipe body 21 passing through the first carrier body 1, a first elastic element 22 (such as a spring) disposed inside the first assembling pipe body 21, and a first movable element 23 movably disposed inside the first assembling pipe body 21 and abutted against the first elastic element 22. More particularly, the first assembling pipe body 21 includes a first outside pipe body 211 connected to the first external joint pipe P1 and a first inside pipe body 212 connected with the first outside pipe body 211. The first outside connection portion 2B is disposed on the first outside pipe body 211 and exposed outside the first carrier body 1, the first inside connection portion 2A is disposed on the first inside pipe body 212 and exposed outside the first carrier body 1, and the first inside pipe body 212 has a first sealing ring 2120 disposed around the first inside connection portion 2A. In addition, the first elastic element 22 is connected between an inner wall surface 2110 of the first outside pipe body 211 and the first movable element 23. Furthermore, the first movable element 23 has a first abutting portion 231, at least one first fluid inlet 232 communicated with (in fluid communication with) the first inside pipe body 212, and at least one first fluid outlet 233 communicated with the at least one first fluid inlet 232, and the first movable element 23 a second sealing ring 230 disposed therearound.

Moreover, referring to FIG. 6 to FIG. 10, and FIG. 11 to FIG. 13, the second connection head module M2 is detachably connected with the first connection head module M1. The second connection head module M2 includes a second carrier body 5 detachably connected with the first carrier body 1, at least two second fluid connectors 6 passing through the second carrier body 5 and respectively detachably connected with the at least two first fluid connectors 2, a second power connector 7 passing through the second carrier body 5 and detachably electrically connected with the first power connector 3, and a second retaining body 8 disposed on the second carrier body 5 and detachably mated with the first retaining body 4. More particularly, each second fluid connector 6 has a second inside connection portion 6A connected with the corresponding the first inside connection portion 2A and a second outside connection portion 6B opposite to the second inside connection portion 6A and connected to a second external joint pipe P2 (such as a flexible hose), and the second power connector 7 includes a second inside conductive connection portion 7A and electrically connected with the first inside conductive connection portion 3A and a second outside conductive connection portion 7B opposite to the second inside conductive connection portion 7A and electrically connected to a second external conductive wire C2.

For example, the second carrier body 5 has at least two second positioning portions 50 for respectively receiving the at least two first positioning portions 10. Each second fluid connector 6 includes a second assembling pipe body 61 passing through the second carrier body 5, an embedded pipe body 62 positioned inside the second assembling pipe body 61, a second elastic element 63 disposed around the embedded pipe body 62, and a second movable element 64 movably disposed around the embedded pipe body 62 and abutted against the second elastic element 63. More particularly, the second assembling pipe body 61 includes a second outside pipe body 611 connected to the second external joint pipe P2 and a second inside pipe body 612 connected with the second outside pipe body 611. The second outside connection portion 6B is disposed on the second outside pipe body 611 and exposed outside the second carrier body 5, the second inside connection portion 6A is disposed inside the second inside pipe body 612 for receiving the first inside connection portion 2A. In addition, the embedded pipe body 62 has a second abutting portion 621 abutted against the first abutting portion 231, at least one second fluid inlet 622 communicated with the second inside pipe body 612, and at least one second fluid outlet 623 communicated with the second outside pipe body 611, and the embedded pipe body 62 has a third sealing ring 620A and a fourth sealing ring 620B both disposed therearound. Furthermore, the second elastic element 63 is connected between an annular portion 624 of the embedded pipe body 62 and the second movable element 64. Moreover, the second movable element 64 is slidably disposed inside the embedded pipe body 62, such that the at least one second fluid inlet 622 can be opened or closed by moving the second movable element 64, and the second movable element 64 has a fifth sealing ring 640 disposed therearound.

More particularly, referring to FIG. 1, FIG. 3, FIG. 8, and FIG. 11 to FIG. 15, the first retaining body 4 includes an elastic member 41 (such as a elastic piece) disposed on a top side of the first carrier body 1 and a pressing member 42 detachably connected with the elastic member 41. The elastic member 41 has a fixing portion 411 fixedly disposed on the top side of the first carrier body 1, at least two elastic arms 412 extended from the fixing portion 411, and a movable portion 413 connected with the at least two elastic arms 412. In addition, the pressing member 42 has a pressing portion 421 disposed under a bottom side of the first carrier body 1 and separated from the first carrier body 1 by a predetermined distance, two extending portions 422 respectively upwardly extended from two opposite lateral sides of the pressing portion 421 and inserted into the first carrier body 1, two clamping portions 423 respectively upwardly extended from the two extending portions 422 for clamping the movable portion 413, two hook portions 424 respectively forwardly extended from the two extending portions 422, two first sliding portions 425 respectively inwardly extended from the two extending portions 422, and two second sliding portions 426 respectively inwardly extended from the two extending portions 422. Moreover, the second retaining body 8 has two hook grooves 80 for respectively receiving the two hook portions 424. Please note, when a user press the pressing portion 421 of the pressing member 42, the two hook portions 424 are respectively separated from the two hook grooves 80, so as to separate the first connection head module M1 from the second connection head module M2 by elastic forces provided by both the first elastic element 22 and the second elastic element 63.

For example, the elastic member 41 has at least one first reinforcement rib 4130 disposed on the movable portion 413, and the pressing member 42 has at least one second reinforcement rib 4210 disposed on the pressing portion 421, at least two third reinforcement ribs 4220 respectively disposed on the two extending portions 422, and at least two fourth reinforcement ribs 4240 respectively disposed on the two hook portions 424. In addition, the first carrier body 1 has two first sliding tracks 101 for respectively receiving the two first sliding portions 425, two second sliding tracks 102 for respectively receiving the two second sliding portions 426, and two position-limiting bumps 103 (such as convex blocks) respectively adjacent to the two second sliding tracks 102. Moreover, each first sliding portion 425 has a plurality of first contact convex points 4250 contacting the corresponding first sliding track 101, and each second sliding portion 426 has a plurality of second contact convex points 4260 contacting the corresponding second sliding track 102 and a position-limiting hook 4261 contacting the corresponding position-limiting bump 103.

Figure 11:
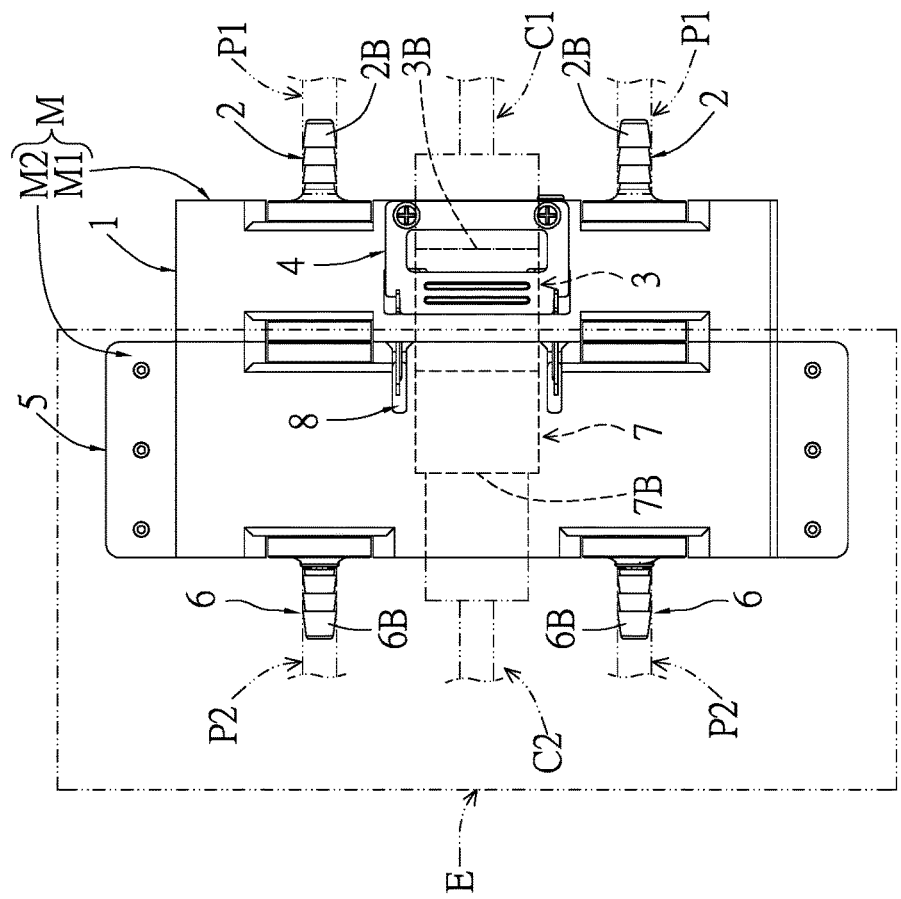
FIG. 11 shows a top, assembled, schematic view of the electronic device and the multifunction integrated connection head assembly structure thereof according to the instant disclosure.
Figure 12:
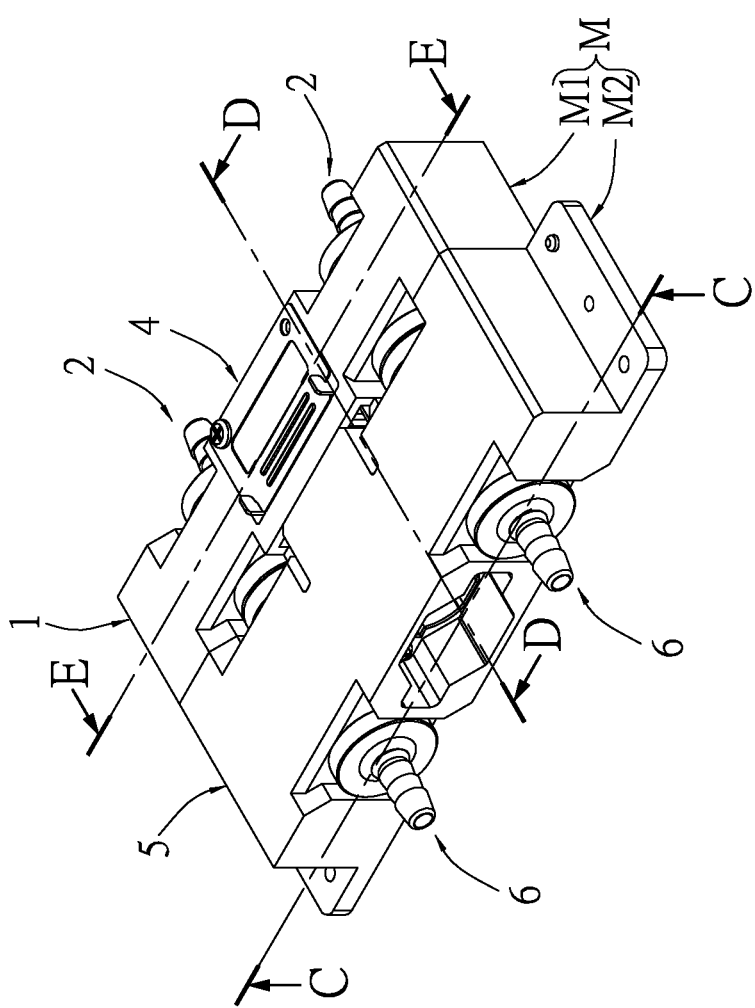
FIG. 12 shows a perspective, assembled, schematic view of the multifunction integrated connection head assembly structure according to the instant disclosure.
Figure 13:
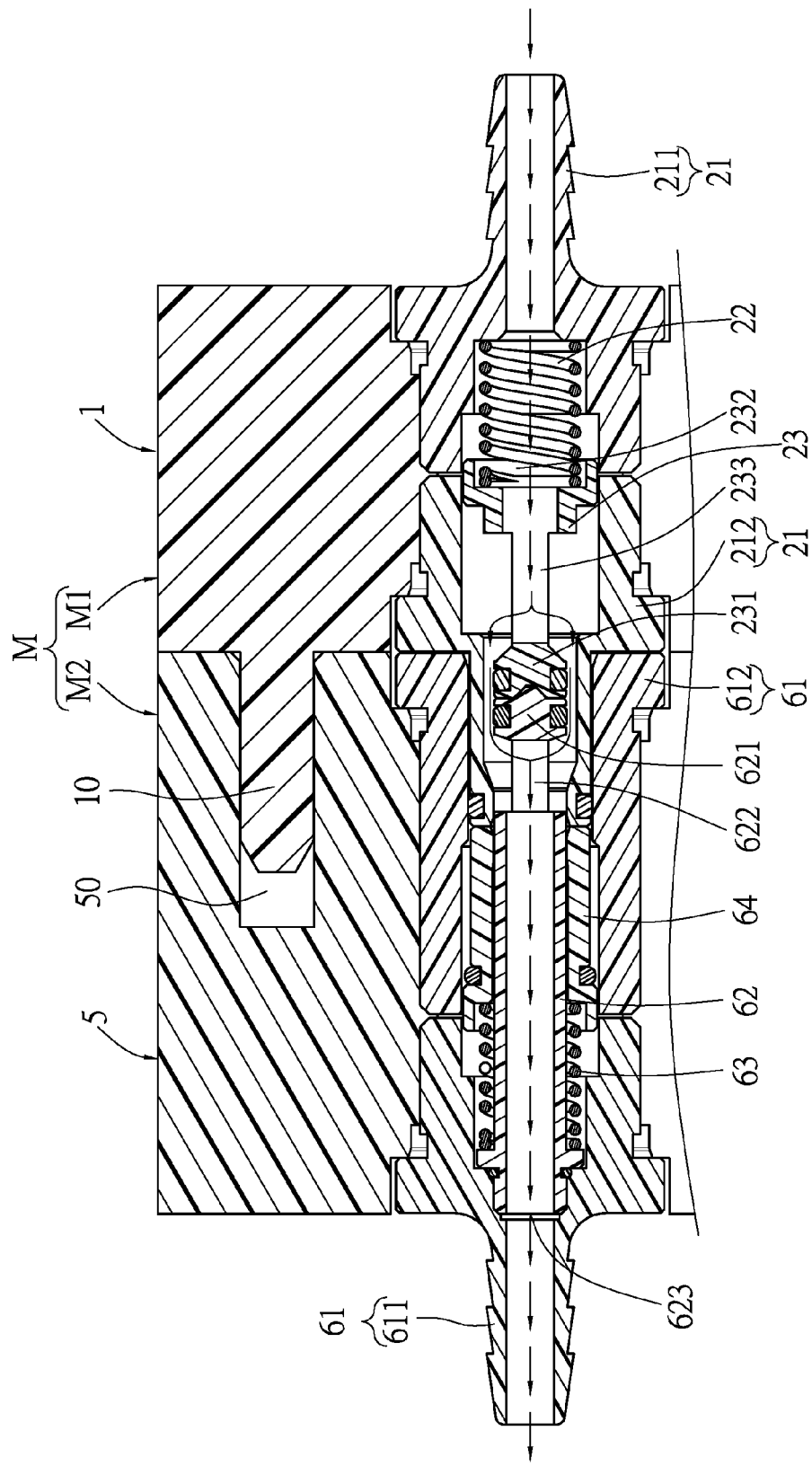
FIG. 13 shows a cross-sectional view taken along the section line C-C of FIG. 12.
Figure 14:
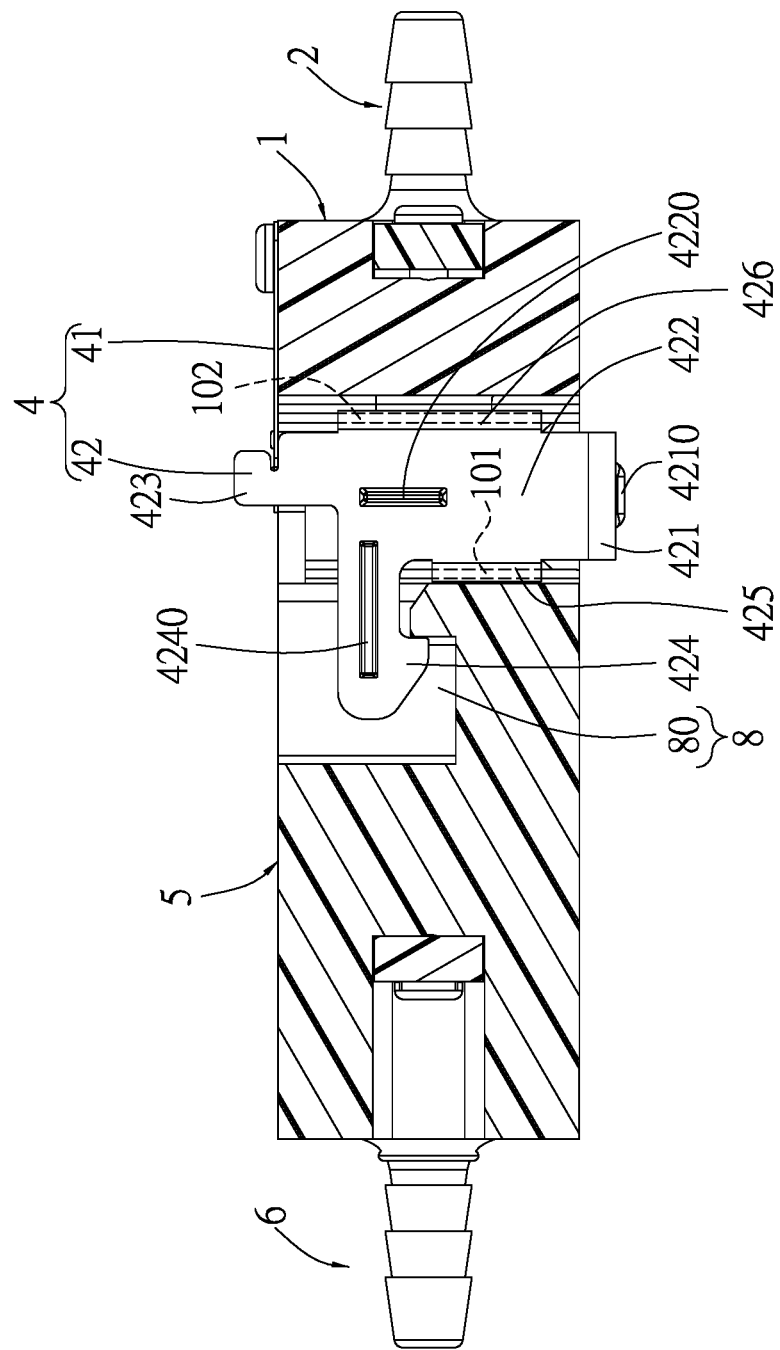
FIG. 14 shows a cross-sectional view taken along the section line D-D of FIG. 12.
Figure 15:
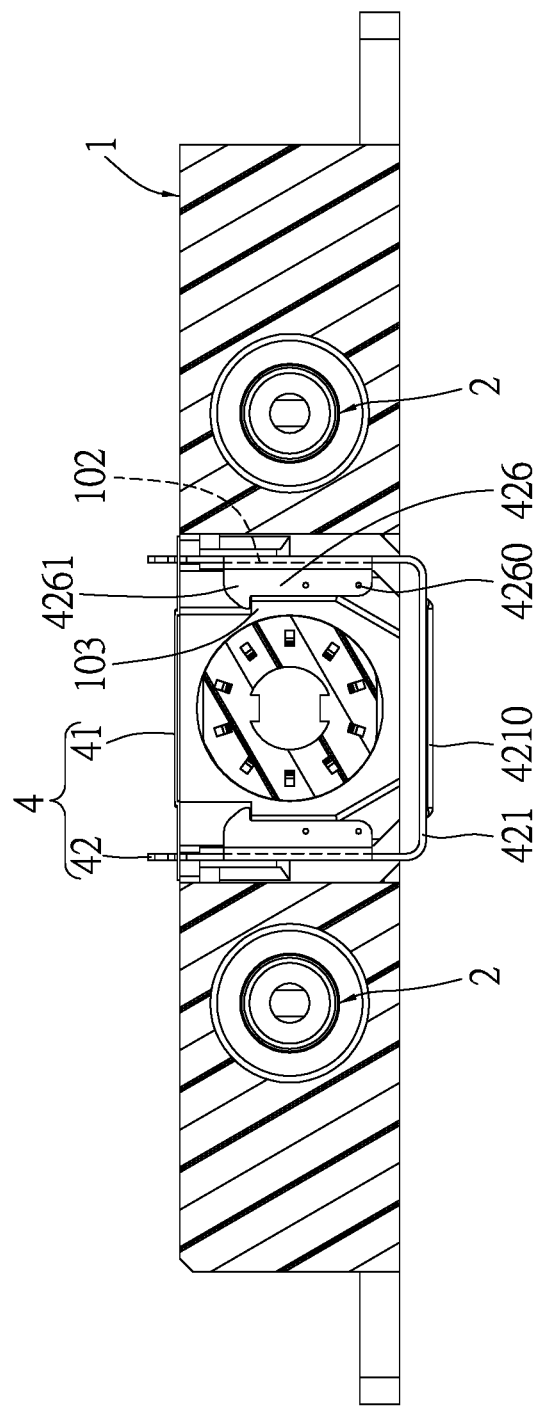
FIG. 15 shows a cross-sectional view taken along the section line E-E of FIG. 12.

Furthermore, as shown in FIG. 11, the instant disclosure further provides an electronic device E using a multifunction integrated connection head assembly structure M. Hence, the multifunction integrated connection head assembly structure M can be applied to any electronic device such as a computer host, in which the second connection head module M2 is disposed inside the electronic device E, and the first connection head module M1 is disposed out of the electronic device E. Please note, the electronic device E can be replaced by any type of heat-dissipating carrier. For example, the heat-dissipating carrier may be a heat-dissipating plate, and the second connection head module M2 is fixed on the heat-dissipating plate.

In conclusion, the at least two first fluid connectors 2 are respectively in fluid communication with the at least two second fluid connector 6 due to the designs of "each first fluid connector 2 having a first inside connection portion 2A and a first outside connection portion 2B opposite to the first inside connection portion 2A and connected to a first external joint pipe P1" and "each second fluid connector 6 having a second inside connection portion 6A connected with the corresponding the first inside connection portion 2A and a second outside connection portion 6B opposite to the second inside connection portion 6A and connected to a second external joint pipe P2". In addition, the first power connector 3 is in electrical communication with the second power connector 7 due to the designs of "the first power connector 3 including a first inside conductive connection portion 3A and a first outside conductive connection portion 3B opposite to the first inside conductive connection portion 3A and electrically connected to a first external conductive wire C1" and "the second power connector 7 including a second inside conductive connection portion 7A and electrically connected with the first inside conductive connection portion 3A and a second outside conductive connection portion 7B opposite to the second inside conductive connection portion 7A and electrically connected to a second external conductive wire C2". Thus, the fluid communication (fluid channels) and the electrical communication (conductive channels) are integrally applied to the same multifunction integrated connection head assembly structure M.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A multifunction integrated connection head assembly structure, comprising:
   a first connection head module including a first carrier body, at least two first fluid connectors, a first power connector, and a first retaining body; and
   a second connection head module including a second carrier body detachably connected with the first carrier body, at least two second fluid connectors respectively detachably connected with the at least two first fluid connectors, a second power connector detachably electrically connected with the first power connector, and a second retaining body detachably mated with the first retaining body;
   wherein each first fluid connector has a first inside connection portion and a first outside connection portion opposite to the first inside connection portion and connected to a first external joint pipe, and each second fluid connector has a second inside connection portion connected with the corresponding first inside connection portion and a second outside connection portion opposite to the second inside connection portion and connected to a second external joint pipe;
   wherein the first retaining body includes an elastic member disposed on a top side of the first carrier body and a pressing member detachably connected with the elastic member,
   wherein the elastic member has a fixing portion fixedly disposed on the top side of the first carrier body, at least two elastic arms extended from the fixing portion, and a movable portion connected with the at least two elastic arms, and the pressing member has a pressing portion disposed under a bottom side of the first carrier body and separated from the first carrier body by a predetermined distance, two extending portions respectively upwardly extended from two opposite lateral sides of the pressing portion and inserted into the first carrier body, two clamping portions respectively upwardly extended from the two extending portions for clamping the movable portion, two hook portions respectively forwardly extended from the two extending portions, two first sliding portions respectively inwardly extended from the two extending portions, and two second sliding portions respectively inwardly extended from the two extending portions, wherein the second retaining body has two hook grooves for respectively receiving the two hook portions.

2. The multifunction integrated connection head assembly structure of claim 1, wherein each first fluid connector includes a first assembling pipe body passing through the first carrier body, a first elastic element disposed inside the first assembling pipe body, and a first movable element movably disposed inside the first assembling pipe body and abutted against the first elastic element, wherein each second fluid connector includes a second assembling pipe body passing through the second carrier body, an embedded pipe body positioned inside the second assembling pipe body, a second elastic element disposed around the embedded pipe body, and a second movable element movably disposed around the embedded pipe body and abutted against the second elastic element.

3. The multifunction integrated connection head assembly structure of claim 2, wherein the first assembling pipe body includes a first outside pipe body connected to the first external joint pipe and a first inside pipe body connected with the first outside pipe body, the first outside connection portion is disposed on the first outside pipe body and exposed outside the first carrier body, the first inside connection portion is disposed on the first inside pipe body and exposed outside the first carrier body, and the first inside pipe body has a first sealing ring disposed around the first inside connection portion, wherein the first elastic element is connected between an inner wall surface of the first outside pipe body and the first movable element, and the first movable element has a first abutting portion, at least one first fluid inlet communicated with the first inside pipe body, and at least one first fluid outlet communicated with the at least one first fluid inlet.

4. The multifunction integrated connection head assembly structure of claim 3, wherein the second assembling pipe body includes a second outside pipe body connected to the second external joint pipe and a second inside pipe body connected with the second outside pipe body, the second outside connection portion is exposed outside the second carrier body, the second inside connection portion is disposed for receiving the first inside connection portion, wherein the embedded pipe body has a second abutting portion abutted against the first abutting portion, at least one second fluid inlet communicated with the second inside pipe body, and at least one second fluid outlet communicated with the second outside pipe body, the second elastic element is connected between an annular portion of the embedded pipe body and the second movable element, and the at least one second fluid inlet is opened or closed by the second movable element.

5. A multifunction integrated connection head assembly structure, comprising:
   a first connection head module including a first carrier body, at least two first fluid connectors passing through the first carrier body, a first power connector passing through the first carrier body, and a first retaining body disposed on the first carrier body; and
   a second connection head module detachably connected with the first connection head module, wherein the second connection head module includes a second carrier body detachably connected with the first carrier body, at least two second fluid connectors passing through the second carrier body and respectively detachably connected with the at least two first fluid connectors, a second power connector passing through the second carrier body and detachably electrically connected with the first power connector, and a second retaining body disposed on the second carrier body and detachably mated with the first retaining body;
   wherein each first fluid connector has a first inside connection portion and a first outside connection portion opposite to the first inside connection portion and connected to a first external joint pipe, and each second fluid connector has a second inside connection portion connected with the corresponding the first inside connection portion and a second outside connection portion opposite to the second inside connection portion and connected to a second external joint pipe;
   wherein the first power connector includes a first inside conductive connection portion and a first outside conductive connection portion opposite to the first inside conductive connection portion and electrically connected to a first external conductive wire, and the second power connector includes a second inside conductive connection portion and electrically connected with the first inside conductive connection portion and a second outside conductive connection portion opposite to the second inside conductive connection portion and electrically connected to a second external conductive wire;

wherein each first fluid connector includes a first assembling pipe body passing through the first carrier body, and each second fluid connector includes a second assembling pipe body passing through the second pipe body;

wherein the first assembling pipe body includes a first outside pipe body connected to the first external joint pipe and a first inside pipe body connected with the first outside pipe body;

wherein the second assembling pipe body includes a second outside pipe body connected to the second external joint pipe and a second inside pipe body connected with the second outside pipe body;

wherein a surface of the first inside pipe body connected to the second inside pipe body is completely fitted to a surface of the second inside pipe body when the first connection head module and the second connection head module are connected together, wherein the first retaining body includes an elastic member disposed on a top side of the first carrier body and a pressing member detachably connected with the elastic member, the elastic member has a fixing portion fixedly disposed on the top side of the first carrier body, at least two elastic arms extended from the fixing portion, and a movable portion connected with the at least two elastic arms, and the pressing member has a pressing portion disposed under a bottom side of the first carrier body and separated from the first carrier body by a predetermined distance, two extending portions respectively upwardly extended from two opposite lateral sides of the pressing portion and inserted into the first carrier body, two clamping portions respectively upwardly extended from the two extending portions for clamping the movable portion, two hook portions respectively forwardly extended from the two extending portions, two first sliding portions respectively inwardly extended from the two extending portions, and two second sliding portions respectively inwardly extended from the two extending portions, wherein the second retaining body has two hook grooves for respectively receiving the two hook portions.

* * * * *